Dec. 15, 1959  R. S. LACKEY ET AL  2,916,917
GYROSCOPIC APPARATUS
Filed Feb. 20, 1956  4 Sheets-Sheet 4

United States Patent Office 2,916,917
Patented Dec. 15, 1959

2,916,917

GYROSCOPIC APPARATUS

Robert S. Lackey, Forest Hills, Pa., and Clarence C. Glover, Baltimore, Md., assignors to Westinghouse Electric Corporation, East Pittsburgh, Pa., a corporation of Pennsylvania Application February 20, 1956, Serial No. 566,470

7 Claims. (Cl. 74—5.4)

This invention relates to gyroscopic apparatus and has particular relation to motion sensing gyroscopic apparatus.

This invention is used in apparatus for controlling the angular position of a body for example, for fire control and flight control and vehicle stabilization purposes and is typified by a gyroscopic unit which senses the movement of the body, in the case of fire control the gun, and in the case of flight control or stabilization the craft or vehicle, and transmits a signal the effect of which is to achieve the desired positioning. In such apparatus it is desirable that the sensing element afford information not only as to displacement; but also, as to the velocity of the apparatus. It is further desirable that the sensing element be highly sensitive and that its operation be highly precise.

It is, accordingly, an object of this invention to provide a highly sensitive, highly precise gyroscopic unit for supplying information both as to the displacement and the velocity of a body under control.

Another object of this invention is to provide gyroscopic apparatus for measuring with high precision the displacement and the velocity of a body under observation.

In accordance with the specific aspects of this invention, a gyroscopic unit including preferably a subminiature gyro restrained to precess about a single axis in a damping medium is provided. The restraining means for the gyro includes a gimbal suspension having antifriction, preferably jewel, bearings. The gimbal is mounted on the bearings so that it and the gyro precess about the single axis. Preferably, the damping fluid is of such specific gravity that there is substantially full flotation of the gimbal element on its bearings, and thus the bearings are, to the extent practicable, relieved. The gimbal element is connected to the coil of a torquer of the movable coil type. The coil moves in a field produced by a permanent magnet, and the torque impressed thereon is proportional to the current flow through the coil. The coil is constructed of as low a weight as practicable so as to minimize the loading on the gimbal element.

The gimbal element also controls the capacity of a variable capacitor, the capacity of this capacitor depending on the angular position of the gimbal element; that is, on the extent of its precession about the single axis. The capacitor is connected in an oscillator circuit and determines the frequency of oscillation of the circuit. This frequency is a measure of the angular position of the gimbal, and the apparatus includes facilities for measuring the frequency which gives an indication of the angular displacement of the gimbal. Measurement of the rate is achieved by introducing a restoring torque through the torquer. This object is accomplished by impressing a potential across the coil of the torquer which is dependent on the measured frequency of the oscillator. The counter torque developed by the torquer thus constitutes a restoring force tending to restore the gimbal as it precesses in the damping medium to its initial position. Measurement of the current through the moving coil of the torquer determines the magnitude of the torque applied to the torquer since the torque is directly proportional to the current. Since this torque is also proportional to the velocity producing precession, the measurement of the current determines the angular velocity.

While the above-described features of the gyro unit in accordance with this invention are essential in the practice of this invention in its specific aspects, the invention in its broader aspects may omit certain of the features. Thus, the invention may be applied as disclosed to a gyro restrained so that it may precess about two axes rather than about only a single axis. In such a case, the unit would include a pair of gimbals, preferably of the antifriction type, suspended for full flotation in a damping fluid, a pair of torquers as described, each mounted to precess with one of the gimbals, and a pair of capacitors each connected to a gimbal so that its capacity varies with the precession of the gimbal. The capacitors may be connected in oscillator circuits as just disclosed. In accordance with a further aspect of this invention, the frequency of the oscillator may be set by a varying inductance rather than capacity. This may be accomplished by causing one coil to move within another coil in dependence upon precession. The capacitor pickup is to be preferred over inductive pickup pecause for the induction pickup it is essential that the coil be centered, and this complicates the operation of the apparatus.

In accordance with the specific aspects of this invention, the damping is provided by a liquid, preferably a fluoro carbon oil. Such an oil is sold under the tradename "Fluorolube" by Hooker Electrochemical Company, Niagara Falls, New York, but may also be secured from Bacon Laboratories of Boston, Massachusetts. The oil is usually produced by polymerizing trifluoro vinyl chloride in the presence of a suitable fluorine containing catalysts. The resulting polymers are built up of a recurring unit

Terminal groups on each end of a chain are derived from the polymerization catalyst or the solvent. The polymers are stabilized by subjecting them to rigorous fluorination conditions. Thus terminal groups are fluorinated and any loosely held chlorine is replaced by fluorine. (See Hooker Bulletin No. 30, 2nd Revision February 14, 1952.)

In accordance with the broader aspects of this invention, the damping may be provided by other facilities, such as magnetically, for example. The liquid damping is superior to damping of other types as far as the practice of this invention is concerned because the mass of the moving parts may be small compared with the equivalent mass of the damping medium liquid. This advantage of the liquid damping is particularly important in the light of the fact that it is essential that in the operation of the gyro unit in accordance with this invention the gimbal deflection or precession be maintained very small, of the order of a few degrees. Since the measurement must be made over the resulting small range between the zero position and the position of maximum deflection, the response must be precise over the whole range. The liquid damping disclosed with the attendant small mass of moving parts has the advantage of yielding precise response and permitting a measurement over this small range; whereas, damping facilities of other types, for example, magnetic damping as a rule require greater deflection and do not produce the desired precise response at small deflections.

The novel features considered characteristic of this invention are discussed generally above. The invention itself, both as to its organization and its method of operation, together with additional objects and advantages thereof will be understood from the following description of a specific embodiment when read in connection with the accompanying drawings, in which:

Fig. 9 is presented herein for the purpose of aiding those skilled in the art in practicing the invention and not with any intention of limiting the scope thereof. Equivalents of the components included in Fig. 9 both as to magnitude and kind are known to those skilled in the art and apparatus including such equivalents are within the scope of this invention.

Figure 1:
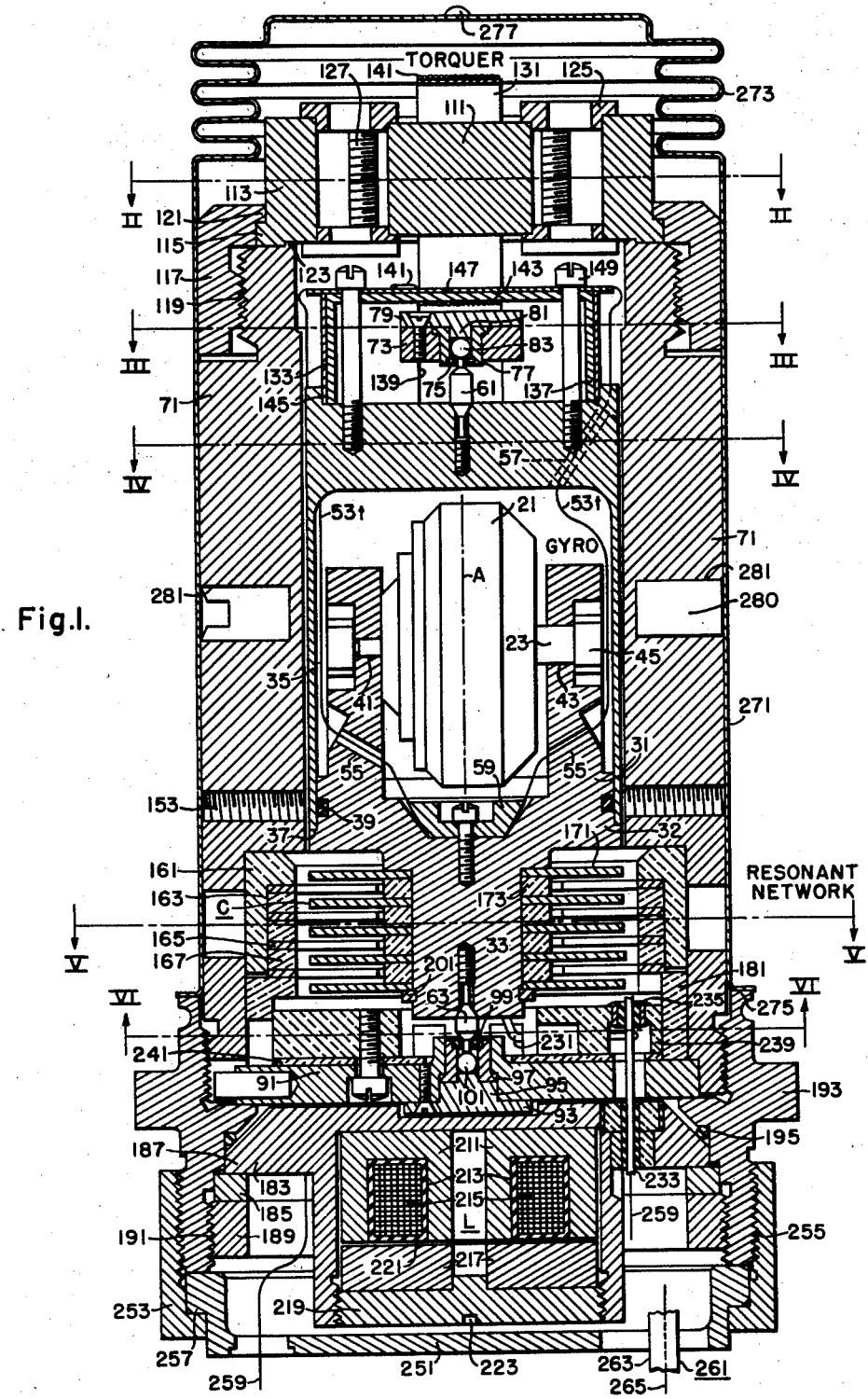
Figure 1 is a view in longitudinal section of a gyro unit in accordance with this invention.

The apparatus shown in the drawings includes a gyro, a torquer mechanically connected to the gyro, a resonant network controlled by the precession of the gyro, and an electrical circuit (Fig. 8) responsive to the network. The electrical circuit includes an oscillator connected to the resonant network so that it oscillates at the frequency of the network, a limiter connected to the output of the oscillator, a discriminator connected to the output of the limiter, and an amplifier connected to the output of the discriminator.

The gyro is not shown in detail. It is a so-called $10^3$ sub-miniature gyro spin motor 21 sold by Westinghouse Electric Corporation and having a velocity of about 8,000 r.p.m. The rotor (not shown) of the motor is mounted on ball bearings to rotate on a bolt 23. The gyro is mounted to precess about an axis A on a gimbal (Fig. 1) which includes a cylindrical cup-shaped body 31 extending from a stem 33 over which a cup-shaped cap 35 extends engaging a shoulder 37 just above the stem and sealed to the base 32 of the body 31 by an O-ring impregnated with epoxy resin in a groove in the body 31. The body 31 has sleeve openings 41 and 43 which serve as bearings for the bolt 23; the bolt being held in the openings by a nut 45. The bodies 31 and 35 provide between them a cavity within which the motor 21 rotates. The resin on the O-ring 39 is cured and when cured serves to hold the parts 31 and 35 together. The O-ring 39 prevents fluid in the remaining portion of the unit from penetrating into the cavity within which the motor 21 is mounted.

Figure 4:
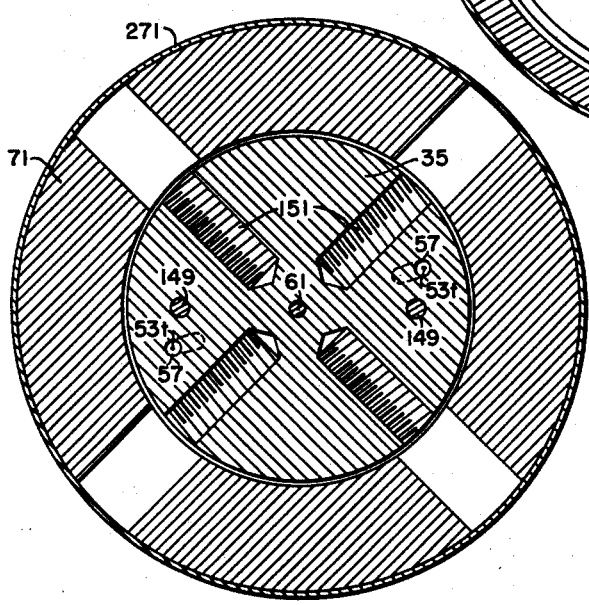
Fig. 4 is a view in transverse section taken along line IV—IV of Fig. 1.
Figure 5:
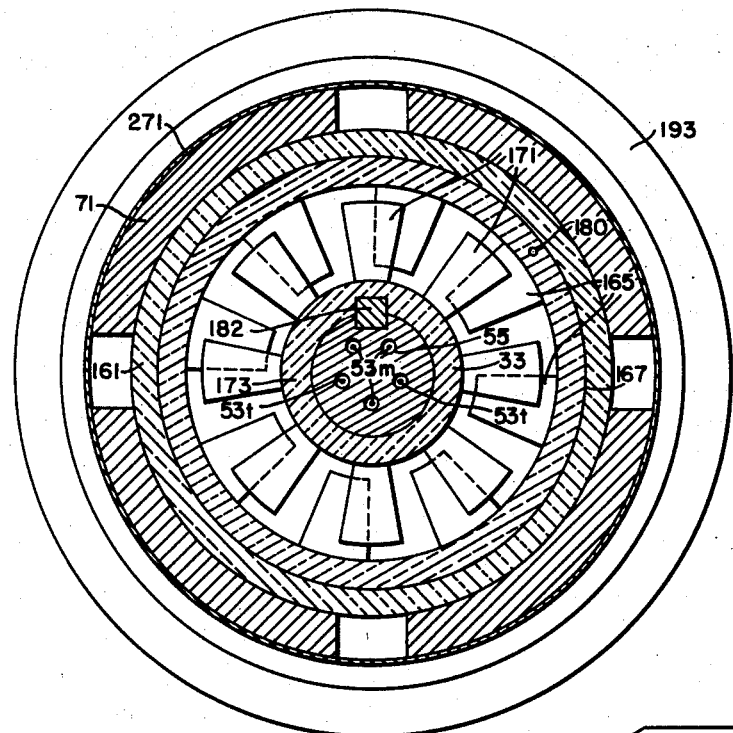
Fig. 5 is a view in transverse section taken along line V—V of Fig. 1.

The stem and the base of cup 31 are provided with a plurality of openings 51 (Fig. 5) through which conductors 53m and 53t pass. These openings are sealed against penetration of fluid by an epoxy resin. Three of the conductors 53m are connected to corresponding motor conductors, and the other two conductors 53t pass through grooves 55 in the cup 31 and through openings 57 (Fig. 4) in the top of the cap cup 35 to the torquer. To separate the conductors, a truncated cone 59 is provided in a groove in the base of the cup 31. The conductors pass around the cone. The cap 35 and the stem 33 of the gimbal have central openings in their ends into which bearing pins 61 and 63 are screwed.

The gimbal 31—33—35 and the gyro 21 within it are restrained to precess about single axis A by an internally cylindrical frame 71. This frame has a bridge 73 (Figs. 1 and 3) near its upper opening into which a jewel bearing assembly is centrally mounted. The assembly includes a disc-shaped jewel bearing 75 mounted in the open end of a small flanged cylinder 77 which is held against a shoulder in the upper face of the bridge 73 by a disc 79 secured to the bridge. The plate 79 has a central projection 81 which extends into the cylinder 77 and a ball bearing 83 is disposed between the jewel bearing 75 and this projection. The upper bearing pin 61 extending from the cap 35 rides in the jewel bearing, with its end engaging the ball bearing 83.

Near the lower end of the frame 71 a cylindrical plate 81 is provided. To this plate a bearing holding disc 93 is secured. The disc 93 has a central part 95 with a projection extending centrally from the hub. A flanged cylinder 97 similar to the cylinder 77 is held between the hub 95 and a shoulder in the plate 91. A jewel bearing disc 99 is secured in the end of the cylinder 97 and a ball bearing 101 is held between the jewel 99 and the projection in the hub 95. The bearing pin 63 extending from the stem 33 rides in the jewel bearing and with its end engaging the ball bearing 101. The ball bearings 83 and 101 on each side of the gimbal 31—33—35 take up the thrust.

Figure 2:
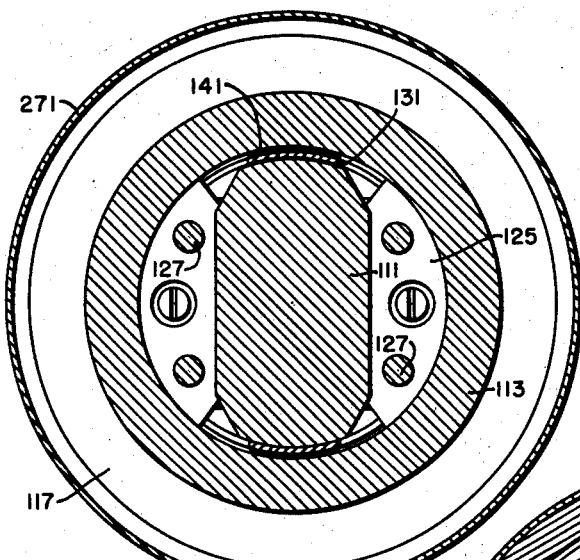
Fig. 2 is a view in transverse section taken along line II—II of Fig. 1.
Figure 7:
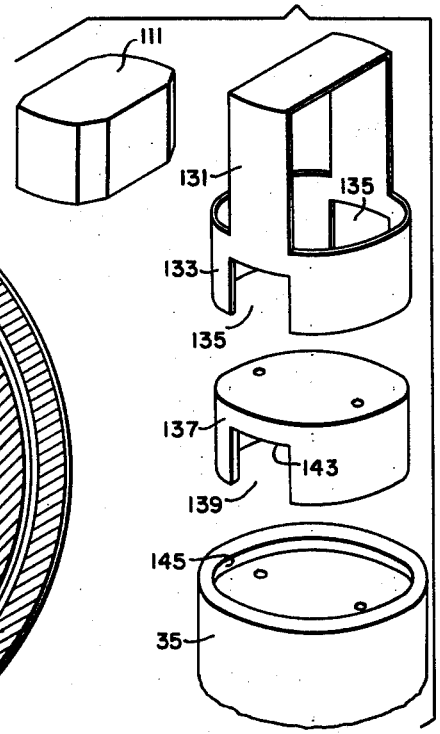
Fig. 7 is an exploded view in perspective showing the essential features of the torquer in accordance with this invention.

The torquer includes a permanent magnet core 111 and a permanent magnet ring 113 constituting a return path for the core (Figs. 1, 2, 7). The ring 113 is provided with a flange 115 by means of which it is secured to the frame 71. The securing means includes a nut 117 which screws on to a thread 119 extending from the frame 71, and the ring is held between the nut 117 and the top of the frame 71 engaging shoulders 121 and 123 in the nut and the frame. The core 111 is suspended from the ring 113 by means of clamps 125 which extend between the ring and the core and are compressed by bolts 127.

The coil is mounted on a light coil form (Figs. 1, 3 and 7) which consists of a rectangular frame 131 extending from a cylindrical shell 133 with which it is integral. The shell is provided with oppositely disposed aligned slots 135. A cup-shaped shell 137 with slots 139 corresponding to the slots in the cylindrical shell is mounted within the cylindrical shell with the slots coincident. The cup 137 is sealed to the shell 133 by an epoxy resin. The coil 141 is wound around the frame 131 passing along the top and sides of the frame end through the slots 135 and 139 and extending across the rim 143 of the cup 137 bounding the slots.

Figure 3:
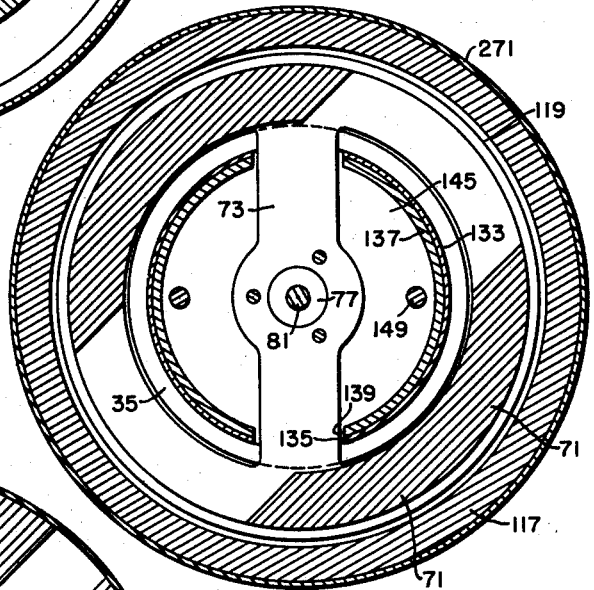
Fig. 3 is a view in transverse section taken along line III—III of Fig. 1.

The shell and cup assembly 131—133—137 is secured to the cap 35 or the gimbal within a cylindrical groove 145 provided in the top of the cap 35 with the bridge 73 and the associated bearing mounting extending through the slots 135 and 139 (Fig. 3). A plate 147 having a printed circuit thereon is secured to the top of the cup-shaped portion 137 of this assembly. The printed circuit plate 147 and the cup 137 are secured to the top of the cap 35 of the gimbal by bolts 149. The printed circuit plate 147 has conductors which provide a connection between the coil 141 wound on the frame 131 and the conductors 53t extending through openings 57 in the gimbal 35 which are sealed by an epoxy resin to prevent penetration of damping fluid.

The frame 71 is provided with a plurality of laterally threaded openings 151 (Fig. 4) opposite the cap 35 of the gimbal. The threaded openings 151 serve to admit threaded plugs which are inserted to balance the gimbal. The frame 71 is also provided with lateral threaded openings 153 (Fig. 1) into which threaded bolts or pins for centering the gimbal 31—33—35 may be inserted.

The resonant network includes a movable plate capacitor C and an inductor L. The stator of the capacitor C includes a ring-shaped insulator 161 (Figs. 1 and 5) having an internal groove 163 within which a plurality of ring-shaped conducting plates 165 separated by spacers 167 are held. The rotor of the capacitor C includes a plurality of ring-shaped conducting plates 171 (Figs. 1 and 5) separated by spacers 173 extending from the stem 33 of the gimbal. The conducting plates 165 and 171, respectively, in each case are conductively connected together.

The stator assembly is held together by an insulating ring 181 which abuts the end plate 91 supporting the gimbal bearing 99. The end plate 91 is urged into engagement with the ring 181 by a hollow flanged cap 183 which is, in turn, urged inwardly by a ring 185 held against the flange 187 by an internal nut 189 screwed into an internal thread 191 in an external nut 193 which screws onto the frame 71. The external nut is provided with a groove within which an O-ring 195 (Fig. 1) is disposed. When the internal nut 189 is screwed into the external nut 193 compressing the cap 183, it compresses the O-ring 195 in the groove, thus preventing leakage from the space within the frame. The rotor assembly is held together by a snap ring 201 (Fig. 1) which engages the lower portion of the stem 33 in a groove and holds the rings 171 and 173 so that they move with the stem 33 as the gimbal precesses.

The inductance L includes a ferrite ring 211 having a ring-shaped groove 213 therein. The coil 215 of the inductance is mounted within this groove 213. The return path for the magnetic flux includes a magnetic disc 217 which extends across the groove 213. The inductance L assembled, is disposed within a recess in the cap 183 and is held in this recess by an externally threaded cap 219 which screws into the cap 183 and engages the disc 217. The longitudinal position of the cap 219 may be adjusted to set the air gap 221 between the parts 211 and 217 of the core of the inductance L. For this purpose a slot 223 is provided in the cap 219.

Figure 6:
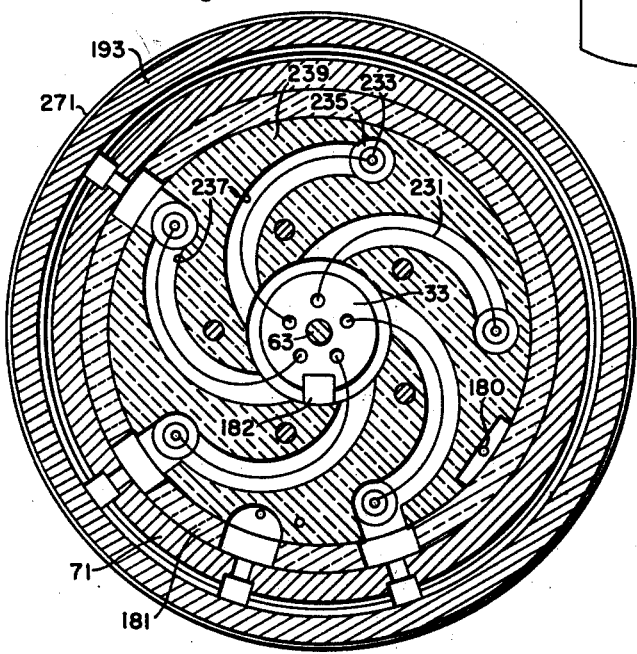
Fig. 6 is a view in transverse section taken along line VI—VI of Fig. 1.

Connection to the motor 21, the coil 141 of the torquer and between the inductance L and the capacity C is effected through light spring ribbons 231 (Fig. 6) which are connected to conducting pins 233 (Figs. 1 and 6) extending through insulating inserts 235 in the plate 239. The conductors pass through grooves 237 in an insulating plate 239 bolted to the end plate 91 with an insulating sheet 241 interposed between the insulating plate 239 and the end plate 91.

An outer cap 251 is provided at the base of the unit. This outer cap is held by a nut 253 which screws onto an external thread 255 on the external nut 193 and has a projection engaging a shoulder 257 on the outer cap 251. The outer cap is provided with openings through which conductors 259 from the pins 233 extend and with an additional opening through which a coaxial cable 261 extends. The coaxial cable 261 includes a sheath 263 connected to the rotor of the capacitor C and a coaxial conductor 265 connected to the inductor L. The stator of the capacitor C is connected to the other terminal of the inductor.

The unit shown in Figs. 1 through 7 assembled with the gimbal 31—33—35 properly balanced and properly centered is provided with a shell-like cover 271 having a sylphon 273 at the top. The cover 271 is soldered to a shoulder 275 extending from the external nut 193. The sylphon is provided at the top with a button 277 having an opening therein and through this button damping fluid, which is preferably of the fluorocarbon type described, is poured in; thereafter the opening is sealed by solder. The fluid provides a damping film between the gimbal 31—33—35 and the frame 71 and also a dielectric for the capacitor.

Thermal bridge elements 280 are embedded in wells 281 in a circumferential groove in the frame. This thermal bridge may be connected to a heater (not shown) which may be set to maintain the temperature of the unit constant.

Figure 8:
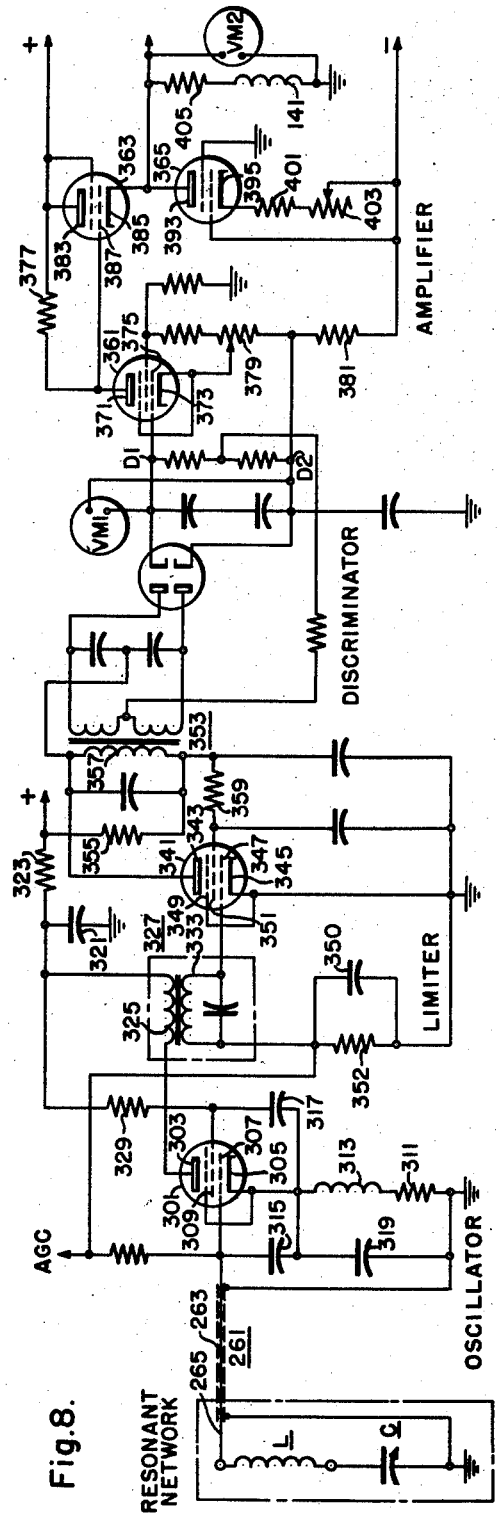
Fig. 8 is a circuit diagram showing displacement and velocity measuring apparatus in accordance with this invention.
Figure 9:
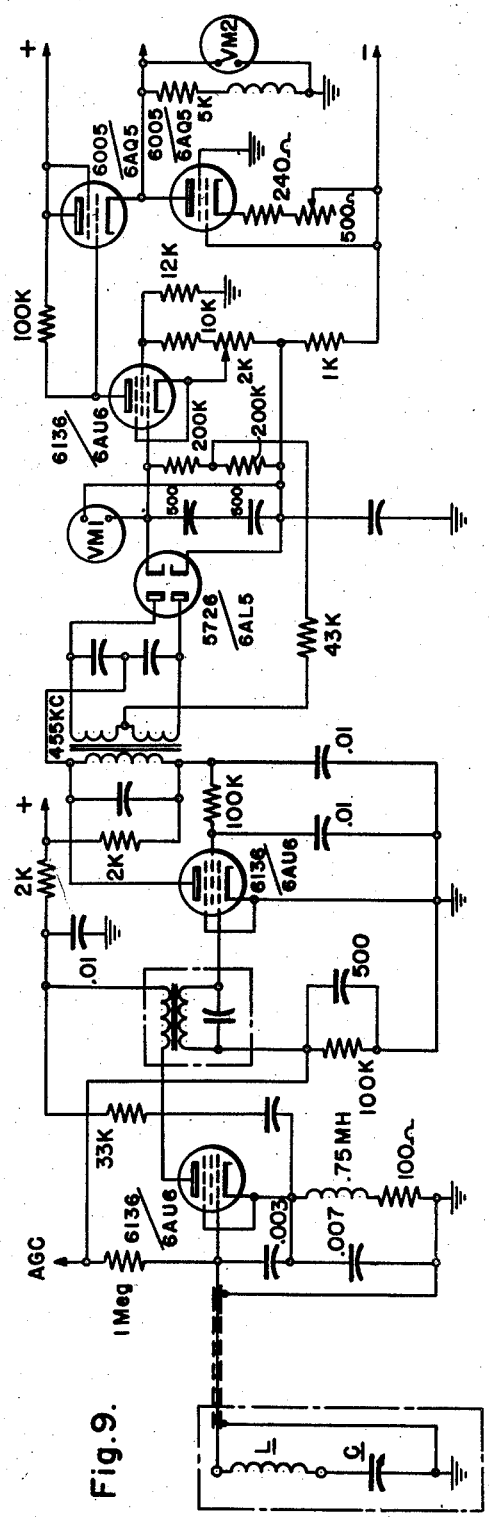
Fig. 9 is a circuit diagram similar to Fig. 8 but giving the magnitudes of the various components used in an embodiment of this invention which has been built and found to operate satisfactorily.

The resonant network L–C is connected through the coaxial cable 261 to the circuit, shown in Fig. 8. This circuit includes an oscillator (which may be as shown a Clapp oscillator) a high vacuum tube 301 having an anode 303, a cathode 305, a control grid 307, and a screen grid 309. The center conductor 265 of the coaxial cable 261 is connected to the control grid and the sheath 263 is grounded. The ground return to the cathode is through a resistor 311 and a choke 313. Addition capacitors 315, 317, 319 are connected between the control grid 307 and screen grid 309, respectively, and the cathode 305 and between the cathode 305 and ground. The tube 301 is supplied with potential from a direct current supply, the negative terminal of which is grounded and the positive terminal of which is connected to the anode 303, through a resistor 323 and the primary 325 of a coupling transformer 327 and to the screen grid 309 through another resistor 329. The resistor 323 is connected to ground through a by-pass capacitor 321.

The oscillator oscillates at the frequency determined by capacity C and inductor L and its output is impressed on the input of the limiter through the secondary 333 which is tuned. The limiter includes a high vacuum tube 341 having an anode 343, a cathode 345, and a control grid 347 in addition to suppressor and screen grids 349 and 351. The secondary 333 is connected between the control grid 347 and the cathode 345 through a biasing network including a capacitor 350 shunted by a resistor 352. There is an automatic gain control connection between the network 350–352 and the control grid 307 of the tube 301 in the oscillator. The output of the limiter is coupled through a transformer 353 to a frequency discriminator of the Foster-Seeley type which produces between its output terminals D1 and D2 a direct-current potential dependent on the frequency. The limiter is supplied from the same source as the oscillator, the anode 343 being connected to the positive terminal through a resistor 355 and the primary 357 of the transformer 353 and the screen grid 351 being connected through the resistor 355 and another resistor 359.

The amplifier is of the direct current type, includes an input high vacuum tube 361 and a pair of output tubes 363 and 365 and is supplied from a direct current supply having positive and negative terminals and an intermediate grounded terminal. The anode 371 of this tube is connected to the positive terminal of a supply through an anode resistor 377. The cathode 373 is connected to the negative terminal of the supply through a variable resistor 379 and a fixed resistor 381. The output terminals D1 and D2 of the discriminator are connected between the grid 375 and the junction of the resistors 379 and 381.

The output tubes 363 and 365 each includes an anode 383, 393, and a cathode 385 and 395. The anodes and cathodes of the output tubes 363 and 365 are connected in series between the positive and negative terminals of the supply through a fixed resistor 401 and a variable resistor 403. The anode 371 of the input tube 361 is connected directly to the grid 387 of the output tube 363. The grid of the other output tube 365 is connected to the negative terminal of the supply so that there is a fixed bias on this tube. The coil 141 of the torquer is connected between the anode 393 and ground through a fixed resistor 405.

The potential impressed from the output terminals D1 and D2 of the discriminator on the input tube of the amplifier determines the potential impressed between the control electrode and the cathode of the controlled output tube 363. This, in turn, then determines the potential of the junction of the cathode 385 and the anode 393.

of the output tubes 363 and 365 and this is the potential across the coil 141 of the torquer. The potential across the coil of the torquer is thus directly dependent; that is, substantially proportional to the frequency of the resonant network and, thus proportional to the precession of the gyro and its gimbal 31—33—35.

The integrated rate or the displacement which produces precession of the gyro about its axis A may be measured by measuring the frequency of the resonant network, as determined by the discriminator. For this purpose, an indicator VM1 is provided across the output conductors of the discriminator. That this measurement is a measurement of the displacement can be understood by consideration of the operation of the apparatus. Let, $H$=the angular momentum of the gyro unit about its precession axis;
$I$=the polar moment of inertia of the gyro;
$\omega$=angular velocity of spin of the gyro;
$W$=the precession angular velocity;
$T_J$=inertia torque resisting precession torque;
$T_D$=damping torque resisting precession torque;
$J$=moment of inertia of gyro and gimbal about its precession axis;
$C$=damping constant;
$\phi$=angular position of gyro gimbal relative to the case as it precesses.

Then, $H=I\omega$ and the precession torque$=HW$ $$HW = T_J + T_D = J\frac{d^2\phi}{dt^2} + C\frac{d\phi}{dt}$$

Integrating, $$H\int W dt = J\frac{d\phi}{dt} + C\phi$$

Now the gyro gimbal is so constructed that J is negligibly small compared to the damping constant C and to the angular momentum H of the gyro unit, and with reasonable accuracy $$H\int W dt = C\phi$$

Thus, the displacement; that is, the time integral of the input velocity, is proportional to the angular displacement of the gyro gimbal about the axis of precession. This displacement is proportional to the frequency of the resonant network and may be measured with the indicator VM1.

The principal features of the apparatus according to this invention which gives it the facility for measuring displacement are:

(a) A flow friction gimbal element suspension. The gyro element is mounted on hard pivots in jewel bearings 75 and 99. The effective loading on the pivots is minimized by full flotation of the gimbal element in the damping fluid. Power input to the gyro motor is achieved through light spring ribbons 231.

(b) A linear gimbal torquer with no hysteresis. The torquer consists of a moving coil 141 located in a region of a direct current flux field and provides the torquing means for electrical input into control configurations using the integrating gyroscope. The moment of inertia of the gimbal structure is minimized by the torque coil structure 131—141 since only the current carrying conductors 141 and the coil form 131 are attached to the gimbal. The massive parts of the torquer, the magnet 111 and flux return path 113 are fastened to the frame 71.

(c) A linear gimbal position measurement scheme. The variable vane capacitor C is attached to the gimbal element in such a way as to change linearly the capacity between the vanes 165 and interposed vanes 171, made fast to the gyro frame. This capacitor C in conjunction with an inductance L and associated circuitry forms the frequency sensitive part of an oscillator whose output frequency is a function of gimbal position relative to the case 71.

(d) Constant viscous damping of the gimbal element. The mechanical resistance to shear of the fluid layer between the gimbal 31—33—35 and the instrument case provides the damping constant C. A thermal bridge 281 measures the temperature of the case 71 adjacent to the fluid layer and controls (not shown) to maintain operation of the unit at constant temperature.

Where the apparatus disclosed herein is to be used for measuring velocity W rather than displacement, the gimbal and the gyro must be subjected to a restoring torque. This restoring torque is provided by impressing a signal proportional to the frequency on the coil 141 of the torquer. It is for this purpose that the coil 141 is connected across the output of the amplifier. With this restoring torque impressed the equation of precession becomes $$HW = \frac{Jd^2\phi}{dt^2} + \frac{Cd\phi}{dt} + K\phi$$

where K includes the effective transfer function of the system including the resonant network, the oscillator, the discriminator, the amplifier, and the torquer. Since the torque produced by current flow through the coil of the torquer is proportional to the current, the torque HW can be measured by measuring the current flow. For this purpose a meter VM2 is connected across the coil 141 and the resistor 405. Since H is constant, this meter measures the velocity.

While a preferred embodiment of this invention has been disclosed herein, many modifications thereof are feasible. The invention, therefore, is not to be restricted except insofar as is necessitated by the spirit of the prior art.

We claim as our invention:

1. In combination, a gyro, gimbal means including antifriction bearings, means restraining said gyro to precess about a single axis, said restraining means including said gimbal means and means mounting said gyro on said gimbal means so that it precesses about said axis on said bearings, a container for said restraining means and said gimbal means, a damping fluid in said container having a specific gravity such that there is substantially full flotation of said gimbal means in said fluid, capacitive means connected to said gyro so that it has a capacity dependent on the precession angle of said gyro about said axis, means connecting said capacitive means in an oscillator circuit having a frequency depending on the capacity of said capacitive means, discriminator means connected to said oscillator circuit for producing a potential dependent on said frequency, a torquer having a movable coil element, said torquer being of the type in which the torque output is directly proportional to the current through the coil element, means connecting said element to said gimbal means so that it is angularly displaced as the gyro precesses about said axis, and means for impressing said potential across said element.

2. In combination, a gyro, gimbal means including antifriction bearings, means permitting said gyro to precess about a single axis, said permitting means including said gimbal means and means mounting said gyro on said gimbal means so that it precesses about said axis on said bearings, a container for said permitting means and said gimbal means, a damping fluid in said container having a specific gravity such that there is substantially full flotation of said gimbal means in said fluid, capacitive means connected to said gyro so that it has a capacity dependent on the precession angle of said gyro about said axis, means connecting said capacitive means in an oscillator circuit having a frequency depending on the capacity of said capacitive means, discriminator means connected to said oscillator current for producing a potential dependent on said frequency, a torquer having a movable coil element, said torquer being of the type in which the torque output is directly proportional to the current through the coil element, means connecting said element to said gimbal means so that it is angularly displaced as the gyro precesses about said axis, and means for impressing said potential across said element.

3. In combination, a gyro, gimbal means including antifriction bearings, means permitting said gyro to precess about a single axis, said permitting means including said gimbal means and means mounting said gyro on said gimbal means so that it precesses about said axis on said bearings, capacitive means connected to said gyro so that it has a capacity dependent on the precession angle of said gyro about said axis, means connecting said capacitive means in an oscillator circuit having a frequency dependent on the capacity of said capacitive means, discriminator means connected to said oscillator circuit for producing a potential dependent on said frequency, a torquer having a movable coil element, said torquer being of the type in which the torque output is directly proportional to the current through the coil element, means connecting said element to said gimbal means so that it is angularly displaced as the gyro precesses about said axis, and means for impressing said potential across said element.

4. In combination, a gyro, gimbal means including antifriction bearings, means permitting said gyro to precess about a single axis, said permitting means including said gimbal means and means mounting said gyro on said gimbal means so that it precesses about said axis on said bearings, a container for said permitting means and said gimbal means, a damping fluid in said container, capacitive means connected to said gyro so that it has a capacity dependent on the precession angle of said gyro about said axis, means connecting said capacitive means in an oscillator circuit having a frequency depending on the capacity of said capacitive means, discriminator means connected to said oscillator circuit for producing a potential dependent on said frequency, a torquer having a movable coil element, said torquer being of the type in which the torque output is directly proportional to the current through the coil element, means connecting said element to said gimbal means so that it is angularly displaced as the gyro precesses about said axis, and means for impressing said potential across said element.

5. In combination, a gyro, gimbal means including antifriction bearings, means permitting said gyro to precess about a single axis, said permitting means including said gimbal means and means mounting said gyro on said gimbal means so that it precesses about said axis on said bearings, a container for said permitting means and said gimbal means, a damping fluid in said container, oscillator means responsive to the precession of said gyro about said axis for producing a signal having a frequency dependent on the angle of precession, discriminator means connected to said oscillator means for producing a potential dependent on said frequency, a torquer having a movable coil element, said torquer being of the type in which the torque output is directly proportional to the current through the coil element, means connecting said element to said gimbal means so that it is angularly displaced as the gyro precesses about said axis, and means for impressing said potential across said element.

6. In combination, a gyro, gimbal means including antifriction bearings, means permitting said gyro to precess about a single axis, said permitting means including said gimbal means and means mounting said gyro on said bearings, damping means cooperative with said permitting means to damp the precession of said gyro about said axis, oscillator means responsive to the precession of said gyro about said axis for producing a signal having a frequency dependent on the angle of precession, discriminator means connected to said oscillator means for producing a potential dependent on said frequency, a torquer having a movable coil element, said torquer being of the type in which the torque output is directly proportional to the current through the coil element, means connecting said element to said gimbal means so that it is angularly displaced as the gyro precesses about said axis, and means for impressing said potential across said element.

7. In combination, a gyro, gimbal means including antifriction bearings, means permitting said gyro to precess about a single axis, said permitting means including said gimbal means and means mounting said gyro on said gimbal means so that it precesses about said axis on said bearings, a container for said permitting means and said gimbal means, a damping fluid in said container having a specific gravity such that there is substantially full flotation of said gimbal means in said fluid, capacitive means connected to said gyro so that it has a capacity dependent on the precession angle of said gyro about said axis, means connecting said capacitive means in an oscillator circuit having a frequency depending on the capacity of said capacitive means, discriminator means connected to said oscillator for producing a potential dependent on said frequency, and means responsive to the output of said discriminator.

References Cited in the file of this patent

UNITED STATES PATENTS

| | | |
|---|---|---|
| 2,089,987 | Urfer | Aug. 17, 1937 |
| 2,242,253 | Lyman | May 20, 1941 |
| 2,687,648 | Konet | Aug. 31, 1954 |
| 2,752,790 | Draper | July 3, 1956 |

FOREIGN PATENTS

| | | |
|---|---|---|
| 1,030,044 | France | Mar. 11, 1953 |